US009777839B2

(12) United States Patent
Monma (10) Patent No.: US 9,777,839 B2
(45) Date of Patent: Oct. 3, 2017

(54) SEALING DEVICE (71) Applicant: NOK Corporation, Tokyo (JP)

(72) Inventor: Hiroaki Monma, Ibaraki (JP)

(73) Assignee: NOK Corporation, Tokyo (JP)

( * ) Notice: Subject to any disclaimer, the term of this patent is extended or adjusted under 35 U.S.C. 154(b) by 0 days.

(21) Appl. No.: 15/124,905

(22) PCT Filed: Nov. 13, 2014

(86) PCT No.: PCT/JP2014/080082
§ 371 (c)(1),
(2) Date: Sep. 9, 2016

(87) PCT Pub. No.: WO2015/136777
PCT Pub. Date: Sep. 17, 2015

(65) Prior Publication Data
US 2017/0097094 A1 Apr. 6, 2017

(30) Foreign Application Priority Data
Mar. 11, 2014 (JP) ................................ 2014-047149

(51) Int. Cl.
*F16J 15/16* (2006.01)
(52) U.S. Cl.
CPC .................................. *F16J 15/166* (2013.01)
(58) Field of Classification Search
CPC .................. F16J 15/16; F16J 15/166
See application file for complete search history.

(56) References Cited

U.S. PATENT DOCUMENTS

| 3,132,869 A * | 5/1964 | Campbell ................ F16J 15/32 |
| | | 251/334 |
| 5,879,010 A * | 3/1999 | Nilkanth ............. E21B 33/1216 |
| | | 277/545 |
| 2009/0189358 A1* | 7/2009 | Briscoe .................. F16J 15/062 |
| | | 277/584 |

FOREIGN PATENT DOCUMENTS

JP          3543617          4/2004

* cited by examiner

*Primary Examiner* — Gilbert Lee
(74) *Attorney, Agent, or Firm* — K. David Crockett, Esq.; Paul J. Backofen, Esq.; Crockett & Crockett, PC (57) ABSTRACT

An object is to provide a backup ring manufacturable with an angle of a cut portion set to a standard cut angle even in the case of a product having a small diameter etc. due to dimensional limitation of a device used therewith, and is solved by a sealing device characterized in that a backup ring 1 is disposed in an annular gap 4 formed by disposing a sloped surface 20 on a member surface of one of two members, i.e., a shaft 2 and a housing 3 having a shaft hole in which the shaft 2 is inserted, with a distance from a counterpart member gradually reduced from a high pressure side toward a low pressure side, that the backup ring 1 is in contract with the sloped surface 20 on the low pressure side relative to a mounted seal member 5 made of an annular elastic member, that the backup ring 1 has an axially extending cylindrical portion 10 and a projecting portion 11 continuously disposed on an end portion of the cylindrical portion 10 on the high pressure side and formed to annularly project in a radial direction from the end portion toward the sloped surface 20, and that the projecting portion 11 has a radial tip surface made up of a taper surface 12 facing the sloped surface 20.

14 Claims, 7 Drawing Sheets

SEALING DEVICE

FIELD OF THE INVENTIONS

The present invention relates to a sealing device and, more particularly, to a sealing device capable of preventing formation of a gap causing biting of a seal member between a backup ring and a shaft under high pressure.

BACKGROUND OF THE INVENTIONS

For example, a device transferring high-pressure fluid such as a fuel injection device conventionally has a sealing structure for sealing an annular gap formed between a housing having a shaft hole and a shaft inserted into the shaft hole. For this sealing structure, a seal member (an o-ring or general rubber-like elastomer material such as a u-packing) is mounted along with a backup ring made of a resin material such as PTFE (polytetrafluoroethylene) coaxially disposed in parallel with the seal member on the pressurized side opposite to the seal member.

The sealing structure is solely achieved by the seal member and the backup ring functions to prevent the seal member from protruding to an annular gap between an outer circumferential surface of the shaft and an inner circumferential surface of the housing due to pressure of hydraulic oil etc.

Figure 8:
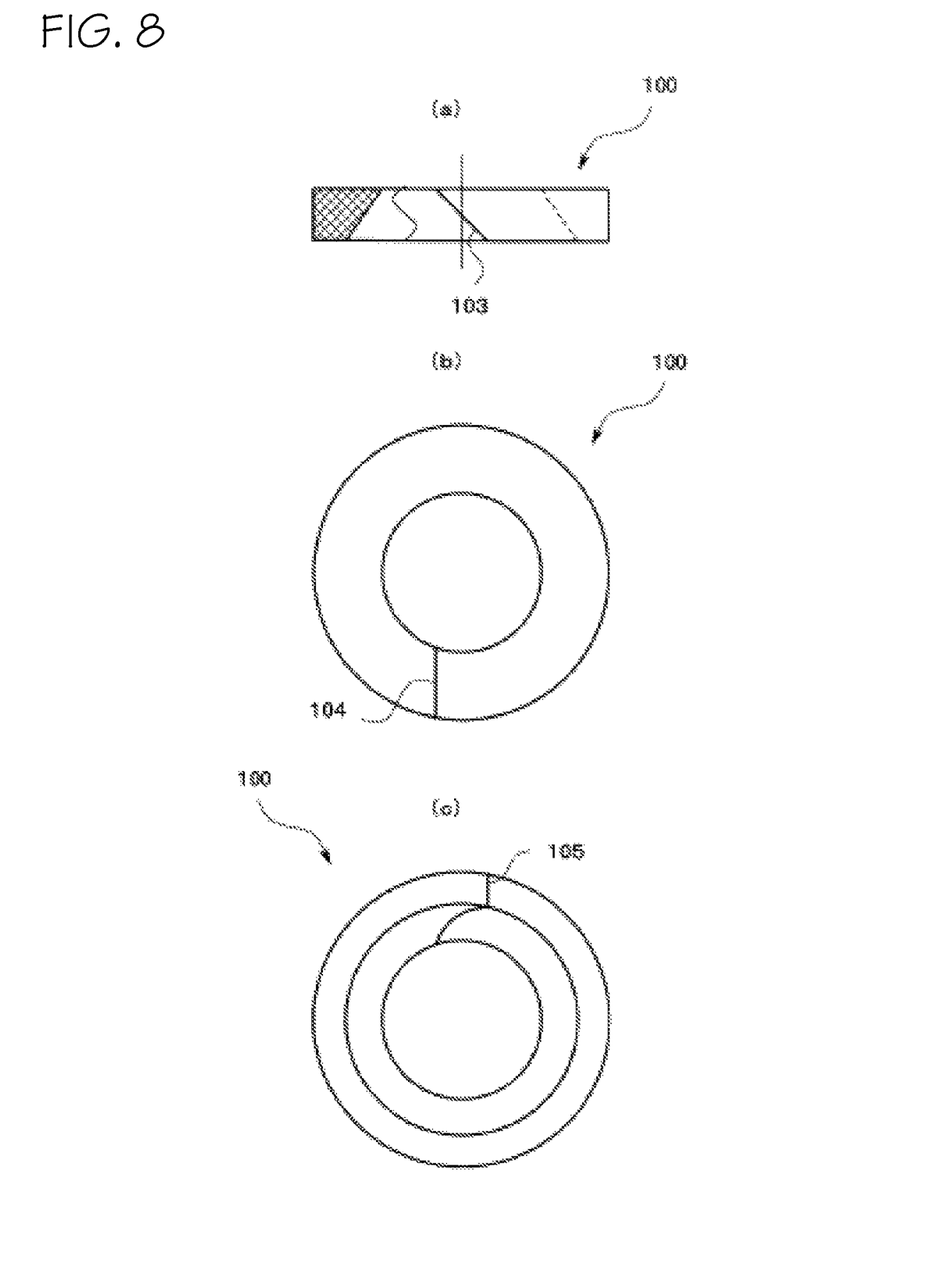
FIG. 8 is a schematic of a configuration of the backup ring according to the conventional example, including (a) a partial cross-sectional explanatory view, (b) a plane view, and (c) a bottom view of the backup ring.

The seal member is made of a rubber-like elastomer material and therefore can be stretched to a larger diameter at the time of mounting on the outer circumference of the shaft. However, the backup ring is made of a synthetic resin material harder than the seal member and, therefore, a cut portion 103 is formed by cutting at least one circumferential position as depicted in FIG. 8 so that the backup ring can be opened to a diameter larger than the outer circumferential surface of a shaft 200 (see FIG. 9) in consideration of mountability.

Figure 9:
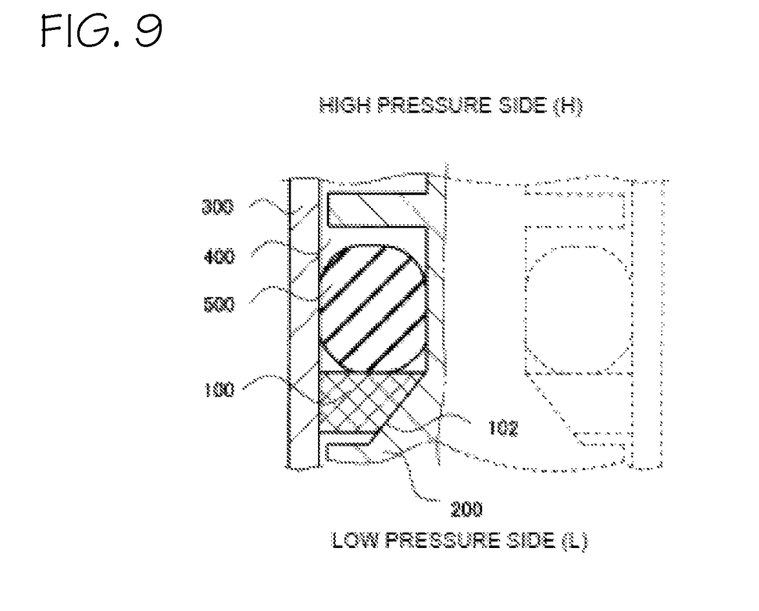
FIG. 9 is a cross-sectional explanatory view of a usage state of the backup ring according to the conventional example.

A technique described in Patent Document 1 depicted in FIG. 9 will be described as an example of the backup ring. Elastic deformation of a backup ring 100 mounted on an outer circumference of a shaft 200 is utilized not only to eliminate a gap between the shaft 200 and the backup ring 100 but also to allow the backup ring 100 to slide relative to the shaft 200, thereby preventing the formation of the gap.

Figure 10:
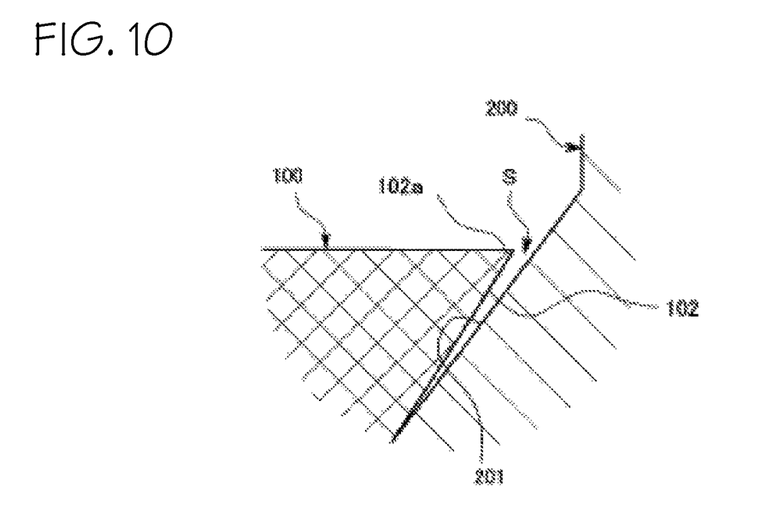
FIG. 10 is an explanatory view of a mounted state of a conventional backup ring.

Therefore, in this conventional example, a sloped surface 201 is disposed on a low pressure side (L) of a groove bottom surface of an annular gap 400 disposed on a shaft-hole inner circumferential surface of a housing 300, from a high pressure side (H) toward the low pressure side (L) (see FIG. 10). An entire inner circumferential surface of the backup ring 100 disposed on the low pressure side (L) adjacently to a seal member is made up of a taper surface 102 sloped along the sloped surface 201 from the high pressure side (H) toward the low pressure side (L). The angle of the sloped surface 201 of the annular gap 400 and the angle of the taper surface 102 of the backup ring 100 are made equal such that sealing is achieved between the both surfaces.

PRIOR ART DOCUMENT

Patent Document

Patent Document 1: Japanese Patent No. 3543617

SUMMARY

Problem to be Solved by the Invention

Depending on final quality etc. of the backup ring 100 at the time of manufacturing, however, the angle of the taper surface 102 may not be coincident with the angle of the sloped surface 201 of the shaft 200, resulting in a gap S between a tip edge 102a on the high pressure side (H) of the taper surface 102 of the backup ring 100 and the sloped surface 201 of the shaft 200 as depicted in FIG. 10. The formation of the gap S as described above between the taper surface 102 of the backup ring 100 and the sloped surface 201 of the shaft 200 may cause biting, which means that the seal member 500 deformed by high pressure protrudes to the annular gap 400 and bites into the gap S, and the seal member 500 may be damaged.

It is therefore a problem of the present invention to provide a sealing device capable of preventing the formation of the gap causing the biting of the seal member between the backup ring and the shaft under high pressure.

Other problems of the present invention will become apparent from the following description.

Means for Solving Problem

The problem is solved by the following aspects of the invention.

1. A sealing device having a seal member made of an annular elastic material and a backup ring arranged in an annular gap, the annular gap being formed between two members that are a shaft and a housing having a shaft hole in which the shaft is inserted, the two members having a sloped surface disposed on a member surface of one of the two members with a distance from a counterpart member gradually reduced from a high pressure side toward a low pressure side, the backup ring being in contact with the sloped surface on the low pressure side relative to the seal member, the backup ring having an axially extending cylindrical portion and a projecting portion continuously disposed on an end portion of the cylindrical portion on the high pressure side and formed to annularly project in a radial direction from the end portion toward the sloped surface, the projecting portion having a radial tip surface made up of a taper surface facing the sloped surface.

2. The sealing device of 1, wherein the cylindrical portion of the backup ring has a radial thickness that is 30 to 50% of a radial thickness of the backup ring from the outer circumference to the tip of the projecting portion.

3. The sealing device of 1 or 2, wherein the projecting portion of the backup ring has an axial thickness that is 40 to 60% of an overall axial thickness from the cylindrical portion across the projecting portion.

4. The sealing device of any one of 1 to 3, wherein
the backup ring has a cut portion linearly cut across a side surface of the projecting portion and a side surface of the cylindrical portion along the axial direction to obliquely intersect with the both side surfaces, wherein
the cut portion has a first cutting line exposed on the side surface of the projecting portion and a second cutting line exposed on the side surface of the cylindrical portion as straight lines parallel to each other, and wherein
the first cutting line has an extended line passing through an inner side of an innermost diameter of the backup ring while the first cutting line and the second cutting line have extended lines passing through an inner side of an innermost diameter of the cylindrical portion.

5. The sealing device of 4, wherein
the backup ring has a cut portion linearly cut across a side surface of the projecting portion and a side surface of the cylindrical portion along the axial direction to obliquely intersect with the both side surfaces, wherein
the cut portion has a first cutting line exposed on the side surface of the projecting portion and a second cutting line exposed on the side surface of the cylindrical portion as straight lines parallel to each other, and wherein
the first cutting line has an extended line passing through an inner side of an innermost diameter of the backup ring while a straight line passes through the center between the first cutting line and the second cutting line in parallel with the first cutting line and the second cutting line without intersecting with a central axis of the backup ring and is positioned closer to the second cutting line relative to the central axis.

6. The sealing device of 4 or 5, wherein the cut portion of the backup ring intersects with the side surface of the projecting portion and the side surface of the cylindrical portion at an angle of 15 to 30 degrees.

Effect of the Invention

The present invention can provide a sealing device capable of preventing the formation of the gap causing the biting of the seal member between the backup ring and the shaft under high pressure.

DETAILED DESCRIPTION OF THE INVENTIONS

An embodiment will now be described with reference to the drawings.

Figure 1:
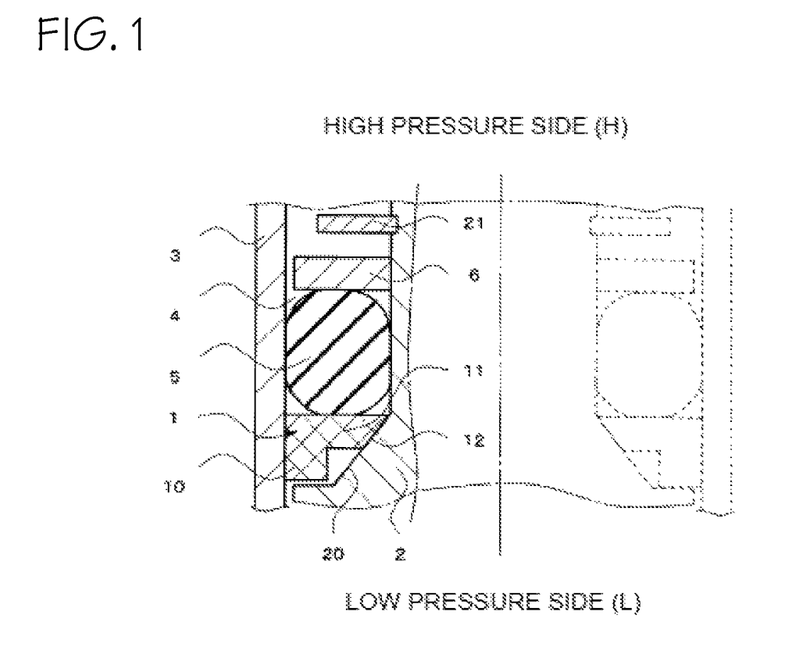
FIG. 1 is a cross-sectional explanatory view of a usage state of a backup ring according to a first embodiment of the present invention.

As depicted in FIG. 1, a sealing device according to the present invention has a backup ring 1 mounted along with a seal member 5 made of an annular elastic material within an annular gap 4 formed by disposing a sloped surface 20 on a member surface of one of two members that are a shaft 2 of a device transferring high-pressure fluid and a shaft hole of a housing 3 in which the shaft 2 is inserted (in this embodiment, on a surface of the shaft 2) with a distance from a counterpart member gradually reduced from the high pressure side (H) toward the low pressure side (L). The backup ring 1 is disposed in contact with the sloped surface 20 on the low pressure side (L) relative to the seal member 5.

The seal member 5 can be achieved by selectively using an o-ring, a square ring, an x-ring, a u-ring, etc., depending on a usage part such as a shape of the annular gap 4.

The backup ring 1 is formed from a thermoplastic resin material etc. harder and having a lower friction coefficient than the seal member 5. For example, the thermoplastic resin material is preferably PA (polyamide resin) as well as PTFE (polytetrafluoroethylene), PFA (tetrafluoroethylene-perfluoroalkylvinyl ether copolymer), and ETFE (tetrafluoroethylene-ethylene copolymer).

The configuration of the backup ring 1 has an axially extending cylindrical portion 10 and a projecting portion 11 continuously disposed on an end portion of the cylindrical portion 10 on the high pressure side (H) and formed to annularly project to the inner circumferential side than the cylindrical portion 10, and is formed to have an L-shaped cross section. When the backup ring 1 is mounted within the annular gap 4, a radial tip surface of the projecting portion 11 projecting toward the sloped surface 20 of the shaft 2 is configured as a taper surface 12 facing the sloped surface 20 of the shaft 2. The taper surface 12 is typically formed to have the same angle as the sloped surface 20.

In FIG. 1, after the backup ring 1 is mounted along with the shaft 2 in the annular gap 4 between the shaft 2 and the housing 3, the seal member 5 is mounted. Subsequently in the present invention, a second backup ring 6 is mounted and then fixed by a fixing ring 21 for preventing coming-off. However, as long as the relationship between the taper surface 12 of the backup ring 1 and the sloped surface 20 of the shaft 2 is satisfied, no particular limitation is placed on the shape, disposition, etc. of the shaft 2, the housing 3, and the annular gap 4.

Figure 2:
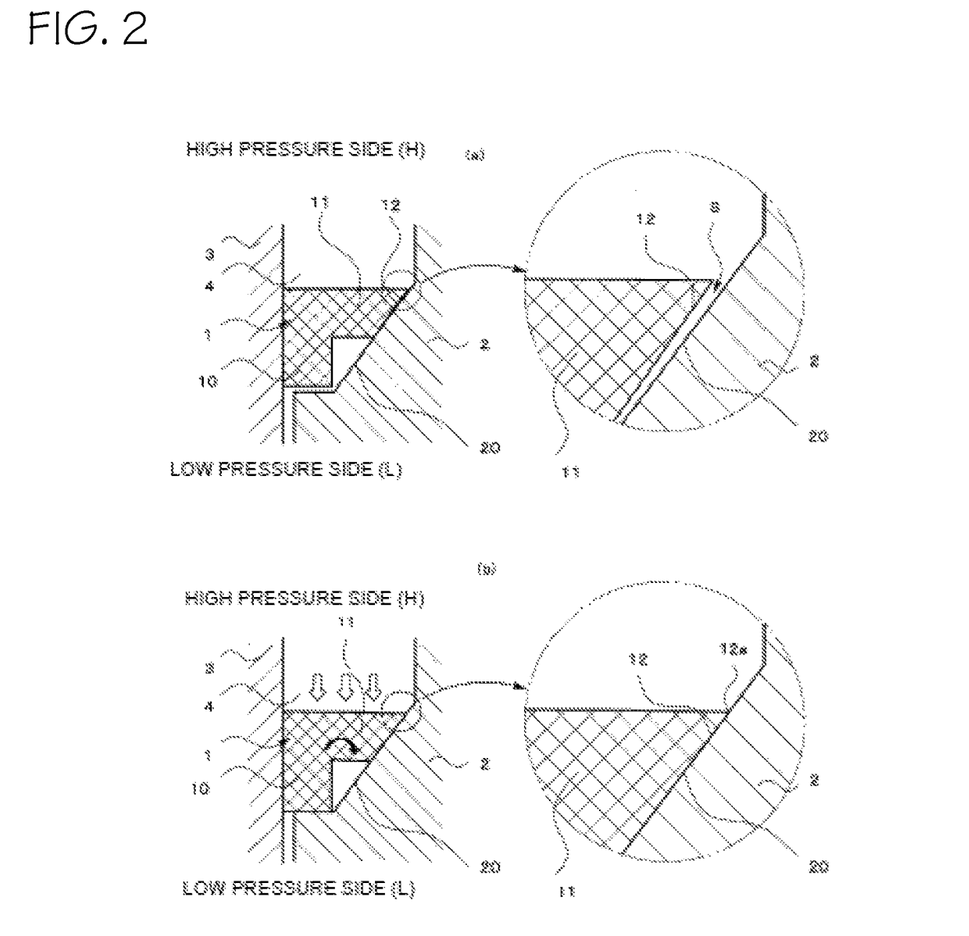
FIG. 2 is a usage view of a state between a projecting portion of the backup ring according to the present invention and a sloped surface disposed on a shaft portion, including (a) a usage state view when a pressure is not applied to the backup ring according to the present invention and (b) a usage state view when a pressure is applied.

The present invention is configured as described above and, as depicted in FIG. 2(a), while no pressure is applied to the backup ring 1, a gap S may be formed between the taper surface 12 of the backup ring 1 and the sloped surface 20 of the shaft 2 although depending on final quality of manufacturing.

When the seal member 5 is deformed due to high pressure, the gap S as described above allows the seal member 5 to bite therein, thereby causing the biting to occur. In the present invention, however, the backup ring 1 has the projecting portion 11 annularly projecting in a radial direction from the cylindrical portion 10 to form the L-shaped cross section with the taper surface 12 formed on the tip surface of the projecting portion 11 and, therefore, when a pressure is applied from the high pressure side (H) as indicated by white arrows to a side surface of the projecting portion 11 of the backup ring 1 as depicted in FIG. 2(b), the projecting portion 11 is easily displaced downward to be bent relative to the cylindrical portion 10 and is pushed down toward the lower side as indicated by a black arrow. As a result, as depicted in FIG. 2(b), the taper surface 12 of the backup ring 1 comes into close contact with the sloped surface 20 of the shaft 2, or a tip edge 12a side of the taper surface 12 on the high pressure side (H) comes into close contact with the sloped surface 20, and in either case, this acts to close the gap S causing the biting of the seal member 5 and certainly prevents the seal member 5 from protruding to the annular gap 4.

If the polyamide resin is used for manufacturing the backup ring 1, the polyamide resin is generally relatively hard as compared to a PTFE material. In the present invention, however, the tip side of the projecting portion 11 is easily displaced downward to be bent relative to the cylindrical portion 10 and, therefore, the taper surface 12 easily comes into close contact with the sloped surface 20 of the shaft 2 even if the relatively hard material is used.

Therefore, the present invention is preferably used as a sealing device of a device with a high pressure applied thereto in which a relatively hard material must be used for the backup ring 1 or specifically a sealing device that must seal high pressure fluid with large pulsation, such as a fuel injection device. Particularly, the fuel injection device has a large injection pressure and the injection pressure will possibly reach the maximum pressure of 30 MPa or higher in the future. However, the present invention can provide the sealing device capable of sufficiently dealing with such a higher pressure.

Since a relatively wide variety of materials can be used for manufacturing the backup ring 1 as described above, a reduction in product cost can be achieved.

Figure 3:
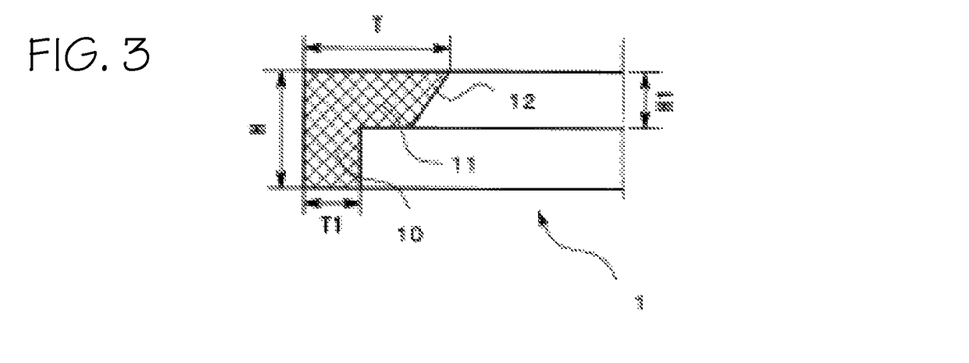
FIG. 3 is a partially cutaway cross-sectional explanatory view of the backup ring according to the first embodiment of the present invention.

As described in FIG. 3, when T is a radial thickness of the backup ring 1 from the outer circumference to the tip of the projecting portion 11 and T1 is a radial thickness of the cylindrical portion 10, the backup ring 1 preferably has the thickness of T1 that is 30 to 50% of the thickness of T.

This is because if the thickness of T1 is equal to or less than 30% and an axial pressure is applied to the backup ring 1, a large portion of the pressure on the high pressure side is supported by the taper surface 12 while an excessive pressure is applied to a narrow side surface of the cylindrical portion 10, which may deform the projecting portion 11 and the cylindrical portion 10 of the backup ring 1.

Conversely, if the thickness of T1 is equal to or greater than 50%, the displacement hardly occurs when a high pressure is applied.

As described in FIG. 3, when H is the thickness of the backup ring 1, i.e., an axial thickness from the cylindrical portion 10 across the projecting portion 11 and H1 is an axial thickness of the projecting portion 11, the backup ring 1 preferably has the thickness of H1 that is 40 to 60% of the thickness of H.

If the thickness of H1 is equal to or less than 40%, the taper surface 12 of the backup ring 1 becomes small and a space portion between the sloped surface 20 of the shaft 2 and the cylindrical portion 10 becomes large. Therefore, the overall strength of the backup ring 1 is weakened.

Conversely, if the thickness of H1 is equal to or greater than 60%, the displacement hardly occurs when a high pressure is applied.

Figure 4:
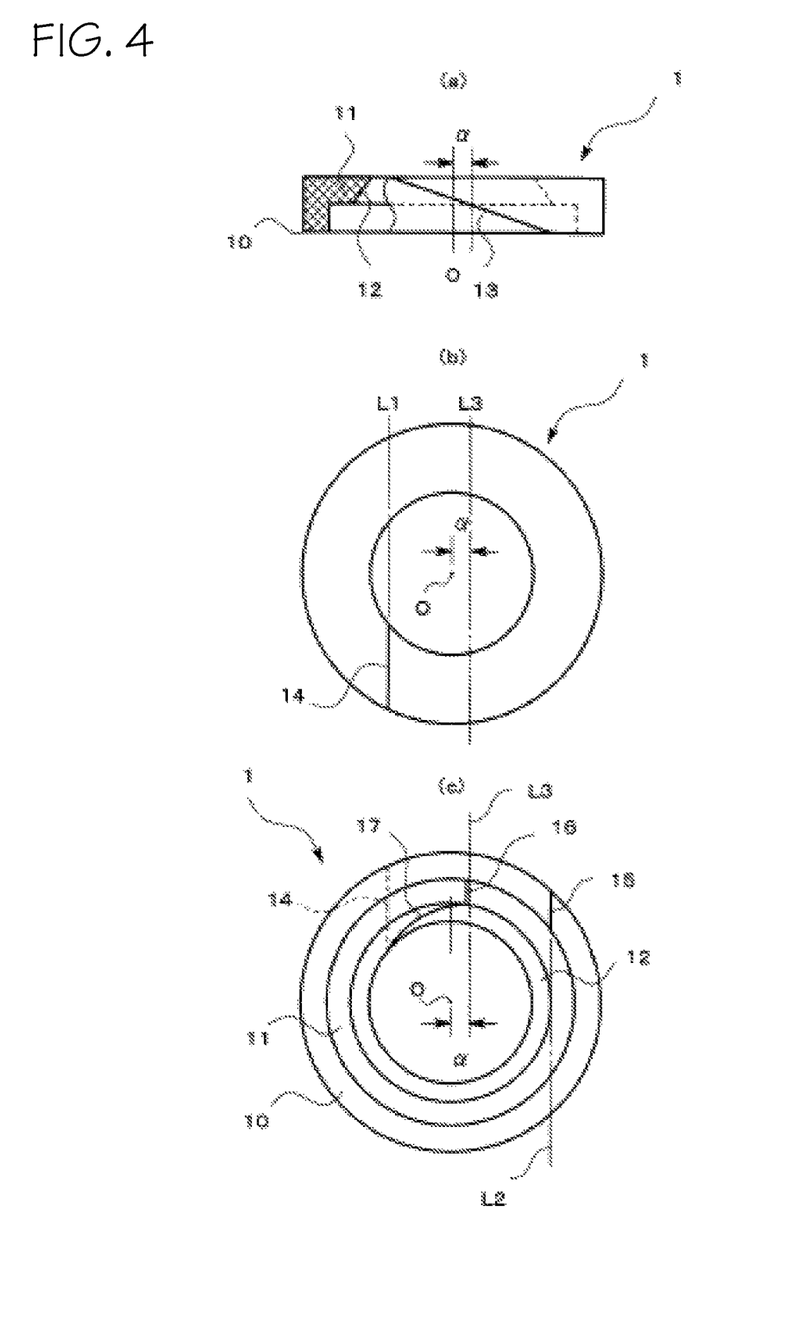
FIG. 4 is a diagram of a configuration of the backup ring according to the first embodiment of the present invention, including (a) a partial cross-sectional explanatory view, (b) a plane view, and (c) a bottom view of the backup ring.

As depicted in FIG. 4, the backup ring 1 has one cut portion 13 cut across the side surface of the projecting portion 11 (an upper side of FIG. 4(a)) and the side surface of the cylindrical portion 10 (a lower side of FIG. 4(a)) along the axial direction to obliquely intersect with the both side surfaces. The cut portion 13 is linearly formed by translating a cutting blade disposed obliquely to the both side surfaces in one direction. The cut portion 13 is cut to obliquely intersect with the both side surfaces at an angle from 10 to 30 degrees, preferably at an angle of 22±5 degrees.

The cut portion 13 has a first cutting line 14 (FIG. 4(b)) exposed on the side surface of the projecting portion 11, a second cutting line 15 (an outer straight line of FIG. 4(c)) exposed on the side surface of the cylindrical portion 10, and a third cutting line 16 (an inner straight line of FIG. 4(c)) appearing as straight lines parallel to each other.

As depicted in FIG. 4(b), the first cutting line 14 is disposed such that an extended line L1 of the first cutting line 14 passes through the inner side of the innermost diameter of the projecting portion 11 of the backup ring 1. As depicted in FIG. 4(c), the second cutting line 15 is disposed such that an extended line L2 of the second cutting line 15 passes through the inner side of the innermost diameter of the cylindrical portion 10.

In FIG. 4, reference numeral 17 denotes a cutting curve of the cut portion 13 appearing on the taper surface 12.

Figure 6:
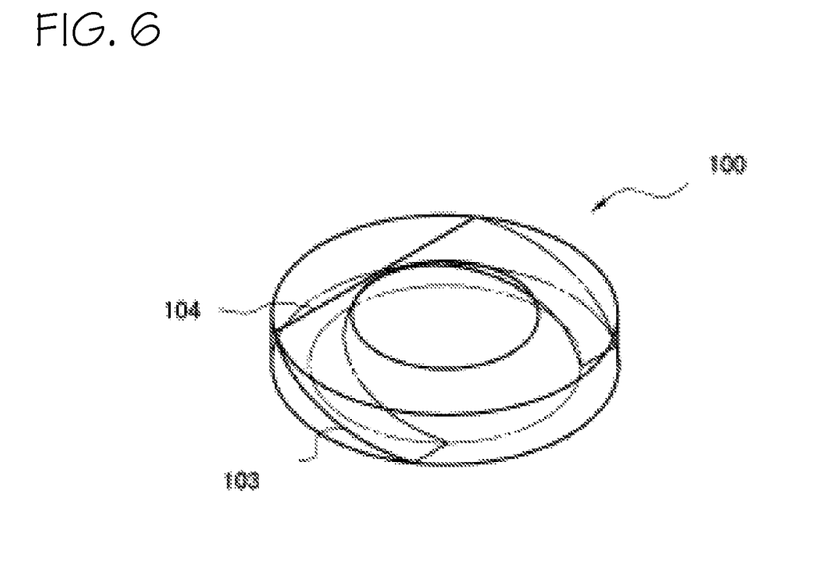
FIG. 6 is a perspective view of a backup ring according to a conventional example cut at a standard cut angle.
Figure 7:
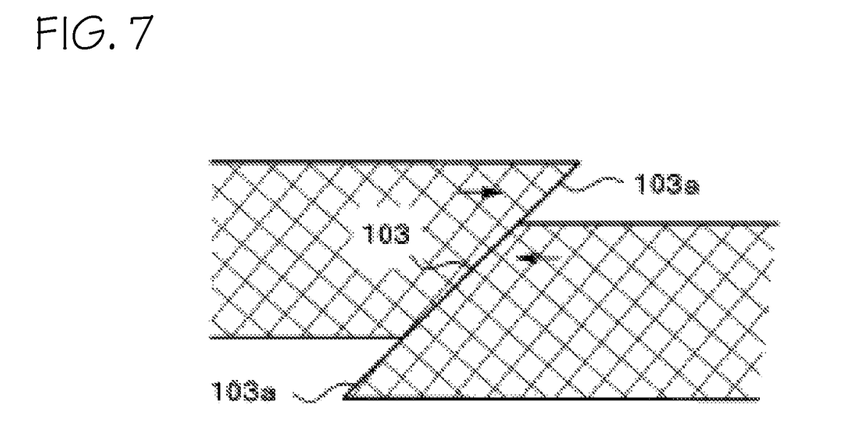
FIG. 7 is a cross sectional explanatory view of a cut portion of the backup ring according to the conventional example.

Taking a conventional backup ring 100 as an example as depicted in FIG. 6, if the angle of the cut portion is formed at an angle of 10 to 30 degrees or preferably at an angle of 22±5 degrees relative to the both side surfaces, one of the cutting lines (the first cutting line 14) inevitably passes through the outer side of the innermost diameter of the backup ring 100 in some cases, and the backup ring 100 is consequently divided into two pieces at the cut portion 103.

In this case, the angle of the cut portion 103 must be formed at a more obtuse angle or, specifically, at an angle of about 45±5 degrees. When the backup ring 100 is thermally expanded and the circumferential length is elongated, both cut surfaces 103a, 103a are shifted to be placed on each other.

In this state, a tip of the cut surface 103a is deformed in a falling manner and, if the cut portion 103 is at an angle of about 45±5 degrees, the tip of the cut surface 103a is hardly deformed even when a high pressure is applied, and may damage the seal member. Such a problem more notably occurs when the backup ring 1 has a smaller diameter since the angle of the cut portion 103 must be an obtuse angle in more cases.

To address such a problem, the cut portion 13 is devised in the present invention. In particular, in FIG. 4, a straight line L3 passes through the center of the linearly-cut cut portion 13 of the backup ring 1 (the center between the first cutting line 14 and the second cutting line 15) in parallel with the first cutting line 14 and the second cutting line 15 without intersecting with a central axis O of the backup ring 1 and is shifted to a position close to the second cutting line 15 relative to the central axis O. As a result, the center position between the first cutting line 14 and the second cutting line 15 (the position of the straight line L3) is offset by α toward the second cutting line 15.

By forming the cut portion 13 such that the first cutting line 14 and the second cutting line 15 are arranged in this way, the first cutting line 14 can be formed on the side surface of the projecting portion 11 defining the innermost diameter of the backup ring 1 such that the first cutting line 14 passes through the inner side of the innermost diameter even when the cut portion 13 is formed at an angle of 10 to 30 degrees or preferably at an angle of 22±5 degrees relative to the both side surfaces, thereby eliminating the problem that the backup ring 1 is divided into two pieces. Therefore, even if both cut surfaces 13a of the backup ring 1 are shifted to be placed on each other, a tip of the cut surface 13a can easily be deformed in a falling manner when a high pressure is applied, and the damage of the seal member can be prevented.

Figure 5:
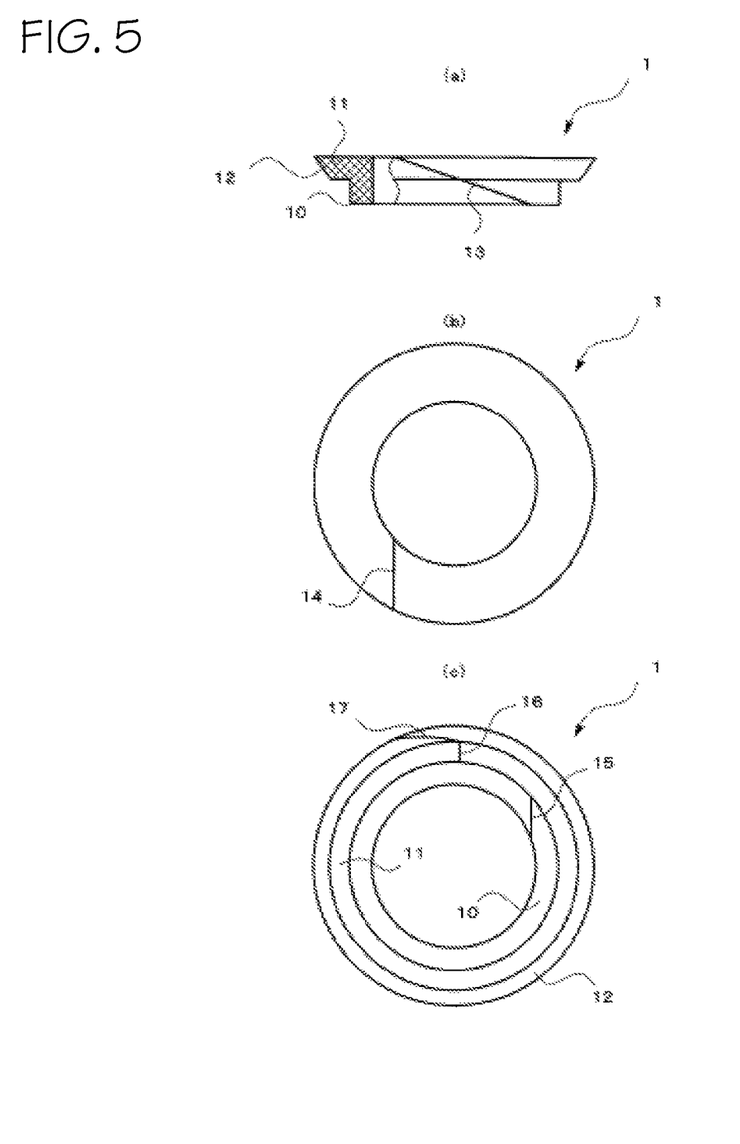
FIG. 5 is a diagram of a configuration of the backup ring according to a second embodiment of the present invention, including (a) a partial cross-sectional explanatory view, (b) a plane view, and (c) a bottom view of the backup ring.

Although the backup ring 1 in the sealing device according to the first embodiment described above has the projecting portion 11 formed to project toward the inner circumference of the cylindrical portion 10, if the sloped surface 20 is disposed on the housing 3, the projecting portion 11 can be formed to project toward the outer circumference of the cylindrical portion 10 as depicted in FIG. 5. The constituent elements other than the projecting portion 11 are the same as the first embodiment and will not be described.

EXPLANATIONS OF LETTERS OR NUMERALS

| | |
|---|---|
| 1 | backup ring |
| 10 | cylindrical portion |
| 11 | projecting portion |
| 12 | taper surface |
| 12a | tip edge |
| 13 | cut portion |
| 13a | cut surface |
| 14 | first cutting line |
| 15 | second cutting line |
| 16 | third cutting line |
| 17 | cutting curve |
| 2 | shaft |
| 20 | sloped surface |
| 21 | fixing ring |
| 3 | housing |
| 4 | annular gap |
| 5 | seal member |
| 6 | backup ring |
| S | gap |

The invention claimed is:

1. A sealing device having a seal member made of an annular elastic material and a backup ring arranged in an annular gap, the annular gap being formed between two members that are a shaft and a housing having a shaft hole in which the shaft is inserted, the two members having a sloped surface disposed on a member surface of one of the two members with a distance from a counterpart member gradually reduced from a high pressure side toward a low pressure side, the backup ring being in contact with the sloped surface on the low pressure side relative to the seal member,
    the backup ring having an axially extending cylindrical portion and a projecting portion continuously disposed on an end portion of the cylindrical portion on the high pressure side and formed to annularly project in a radial direction from the end portion toward the sloped surface,
    the projecting portion having a radial tip surface made up of a taper surface facing the sloped surface.

2. The sealing device of claim 1, wherein the cylindrical portion of the backup ring has a radial thickness that is 30 to 50% of a radial thickness of the backup ring from the outer circumference to the tip of the projecting portion.

3. The sealing device of claim 2, wherein the projecting portion of the backup ring has an axial thickness that is 40 to 60% of an overall axial thickness from the cylindrical portion across the projecting portion.

4. The sealing device of claim 3, wherein
    the backup ring has a cut portion linearly cut across a side surface of the projecting portion and a side surface of the cylindrical portion along the axial direction to obliquely intersect with the both side surfaces, wherein
    the cut portion has a first cutting line exposed on the side surface of the projecting portion and a second cutting line exposed on the side surface of the cylindrical portion as straight lines parallel to each other, and wherein
    the first cutting line has an extended line passing through an inner side of an innermost diameter of the backup ring while the first cutting line and the second cutting line have extended lines passing through an inner side of an innermost diameter of the cylindrical portion.

5. The sealing device of claim 4, wherein
    a straight line passes through the center between the first cutting line and the second cutting line in parallel with the first cutting line and the second cutting line without intersecting with a central axis of the backup ring and is positioned closer to the second cutting line relative to the central axis.

6. The sealing device of claim 1, wherein the projecting portion of the backup ring has an axial thickness that is 40 to 60% of an overall axial thickness from the cylindrical portion across the projecting portion.

7. The sealing device of claim 2, wherein
    the backup ring has a cut portion linearly cut across a side surface of the projecting portion and a side surface of the cylindrical portion along the axial direction to obliquely intersect with the both side surfaces, wherein
    the cut portion has a first cutting line exposed on the side surface of the projecting portion and a second cutting line exposed on the side surface of the cylindrical portion as straight lines parallel to each other, and wherein
    the first cutting line has an extended line passing through an inner side of an innermost diameter of the backup ring while the first cutting line and the second cutting line have extended lines passing through an inner side of an innermost diameter of the cylindrical portion.

8. The sealing device of claim 7, wherein
    a straight line passes through the center between the first cutting line and the second cutting line in parallel with the first cutting line and the second cutting line without intersecting with a central axis of the backup ring and is positioned closer to the second cutting line relative to the central axis.

9. The sealing device of claim 6, wherein
    the backup ring has a cut portion linearly cut across a side surface of the projecting portion and a side surface of the cylindrical portion along the axial direction to obliquely intersect with the both side surfaces, wherein
    the cut portion has a first cutting line exposed on the side surface of the projecting portion and a second cutting line exposed on the side surface of the cylindrical portion as straight lines parallel to each other, and wherein
    the first cutting line has an extended line passing through an inner side of an innermost diameter of the backup ring while the first cutting line and the second cutting line have extended lines passing through an inner side of an innermost diameter of the cylindrical portion.

10. The sealing device of claim 9, wherein
    a straight line passes through the center between the first cutting line and the second cutting line in parallel with the first cutting line and the second cutting line without intersecting with a central axis of the backup ring and is positioned closer to the second cutting line relative to the central axis.

11. The sealing device of claim 1, wherein
the backup ring has a cut portion linearly cut across a side surface of the projecting portion and a side surface of the cylindrical portion along the axial direction to obliquely intersect with the both side surfaces, wherein
the cut portion has a first cutting line exposed on the side surface of the projecting portion and a second cutting line exposed on the side surface of the cylindrical portion as straight lines parallel to each other, and wherein
the first cutting line has an extended line passing through an inner side of an innermost diameter of the backup ring while the first cutting line and the second cutting line have extended lines passing through an inner side of an innermost diameter of the cylindrical portion.

12. The sealing device of claim 11, wherein
a straight line passes through the center between the first cutting line and the second cutting line in parallel with the first cutting line and the second cutting line without intersecting with a central axis of the backup ring and is positioned closer to the second cutting line relative to the central axis.

13. The sealing device of claim 12, wherein the cut portion of the backup ring intersects with the side surface of the projecting portion and the side surface of the cylindrical portion at an angle of 15 to 30 degrees.

14. The sealing device of claim 11, wherein the cut portion of the backup ring intersects with the side surface of the projecting portion and the side surface of the cylindrical portion at an angle of 15 to 30 degrees.

* * * * *